Figure 1:
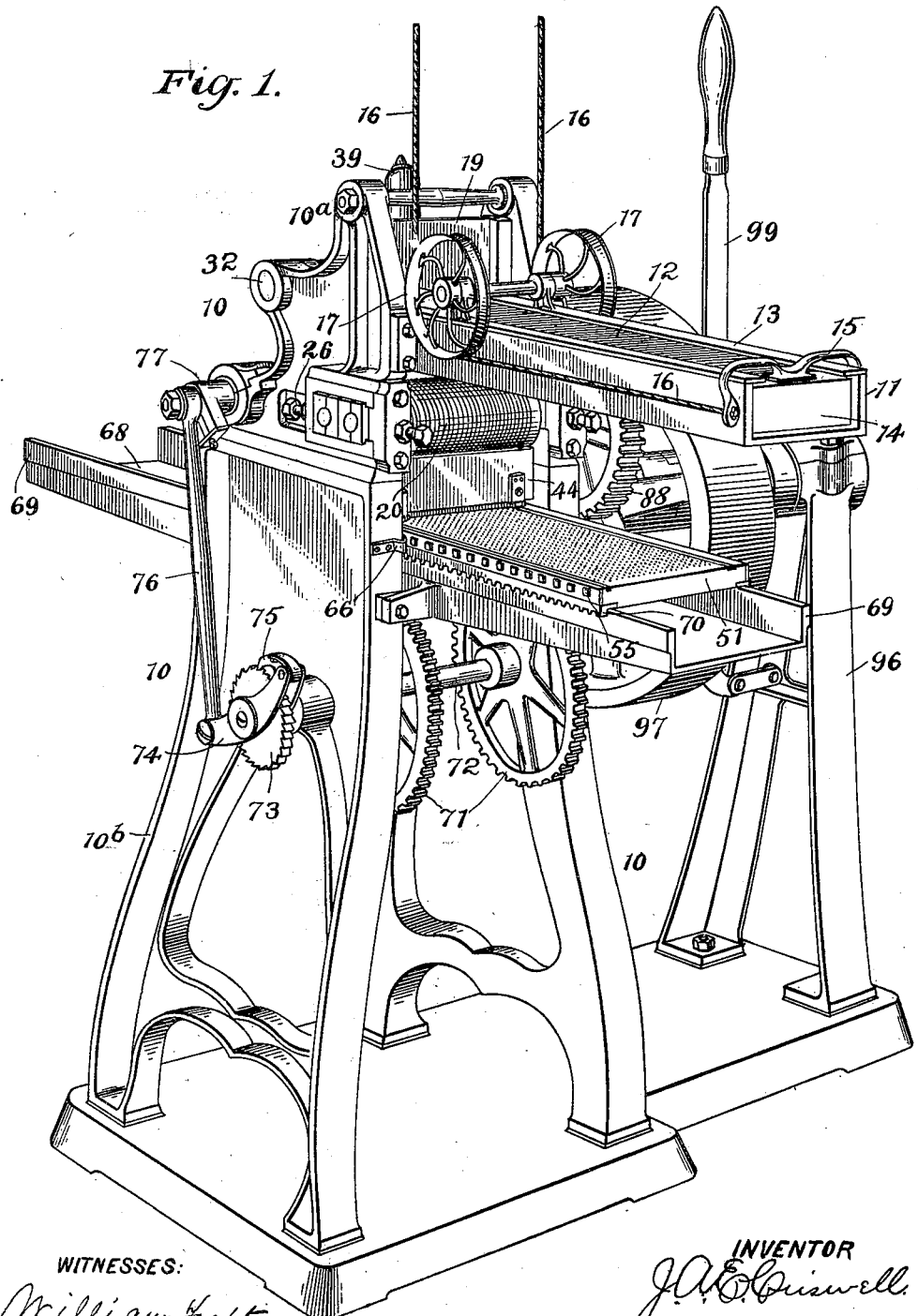

No. 656,014. Patented Aug. 14, 1900.
J. A. E. CRISWELL.
MACHINE FOR MAKING MATCHES.
(Application filed June 1, 1900.)

(No Model.) 7 Sheets—Sheet 1.

WITNESSES:
INVENTOR

No. 656,014. Patented Aug. 14, 1900.
J. A. E. CRISWELL.
MACHINE FOR MAKING MATCHES.
(Application filed June 1, 1900.)
(No Model.) 7 Sheets—Sheet 3.

WITNESSES: INVENTOR

No. 656,014. Patented Aug. 14, 1900.
J. A. E. CRISWELL.
MACHINE FOR MAKING MATCHES.
(Application filed June 1, 1900.)
(No Model.) 7 Sheets—Sheet 4.
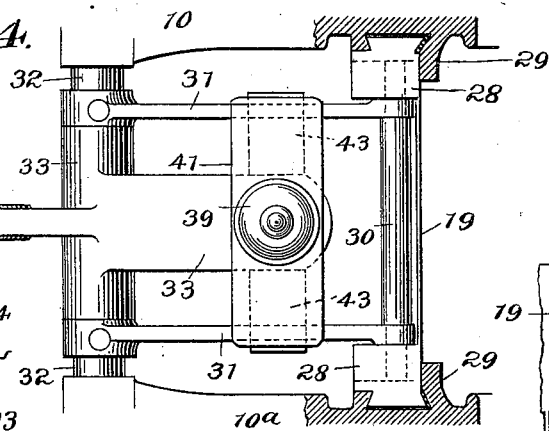
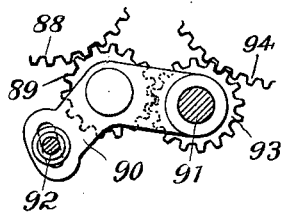
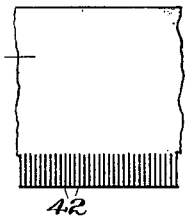
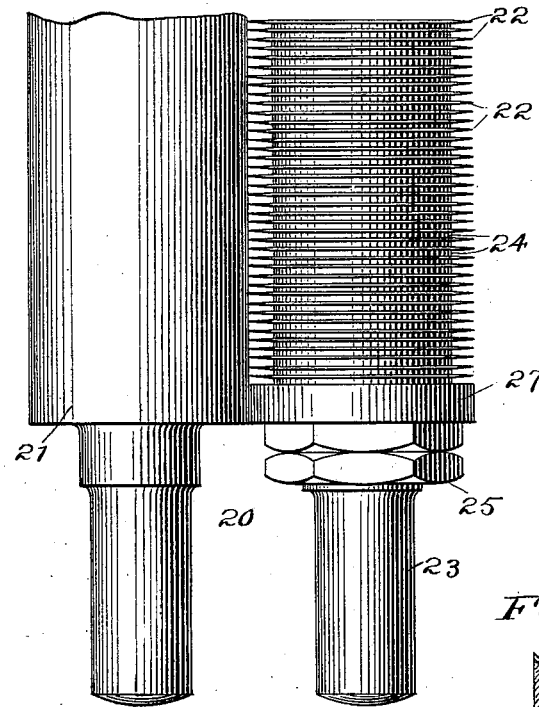
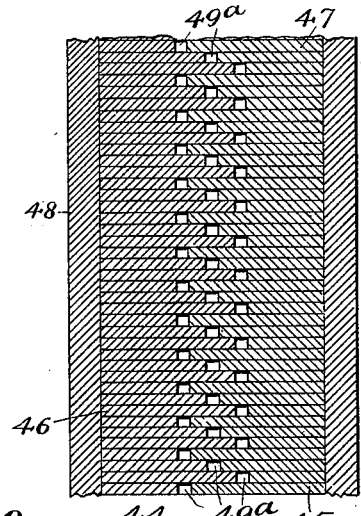
WITNESSES:
William Foster
A. W. Stanley
INVENTOR
J. A. E. Criswell No. 656,014. Patented Aug. 14, 1900.
J. A. E. CRISWELL.
MACHINE FOR MAKING MATCHES.
(Application filed June 1, 1900.)
(No Model.) 7 Sheets—Sheet 5.
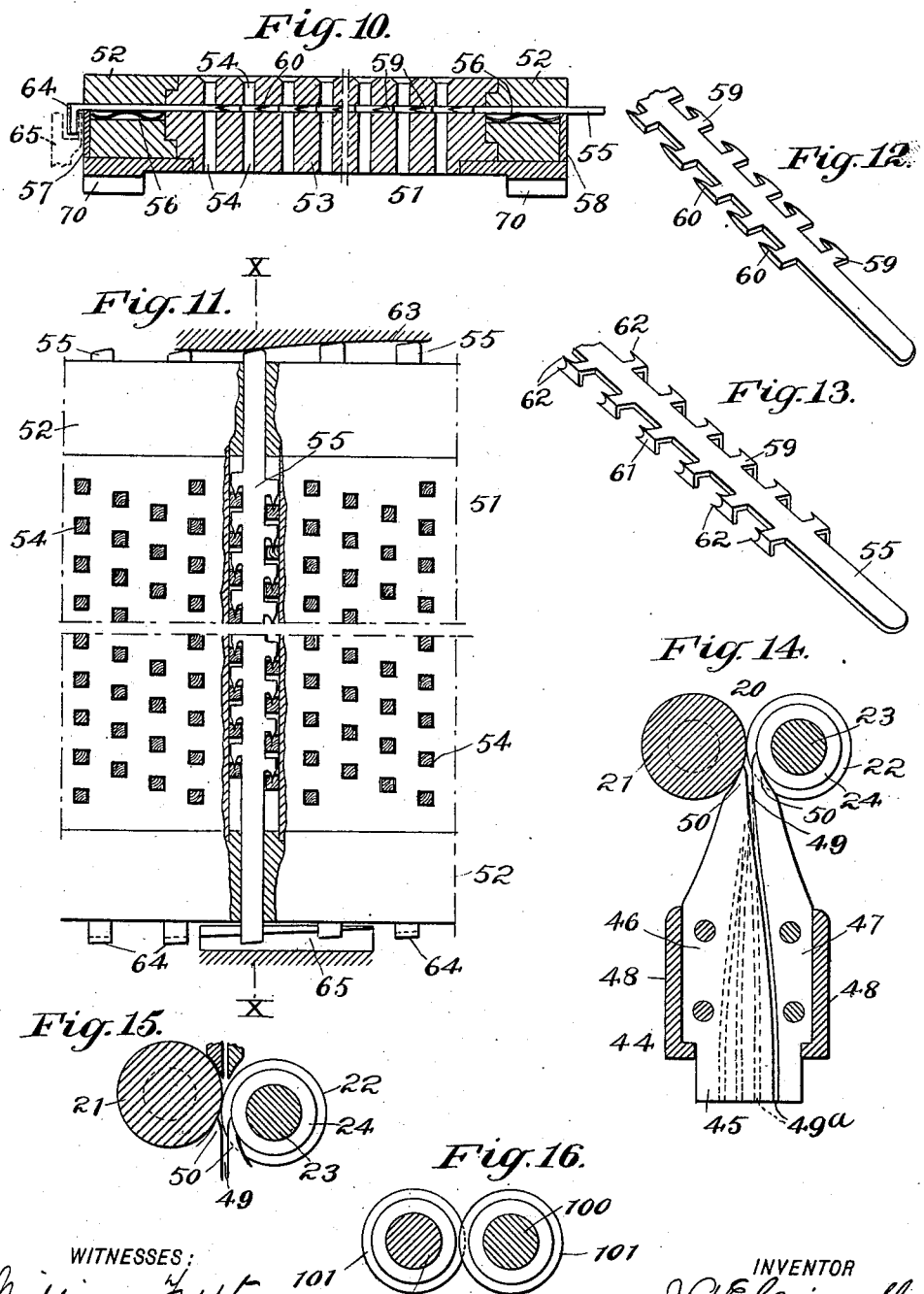

No. 656,014. Patented Aug. 14, 1900.
J. A. E. CRISWELL.
MACHINE FOR MAKING MATCHES.
(Application filed June 1, 1900.)
(No Model.) 7 Sheets—Sheet 6.
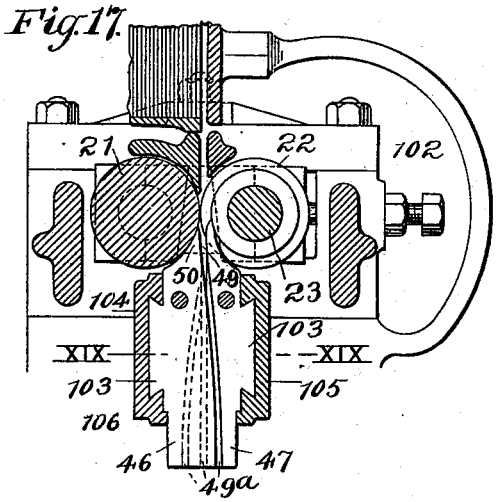
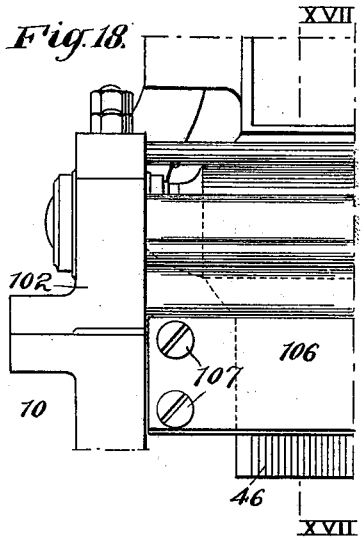
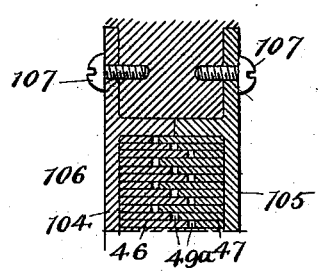
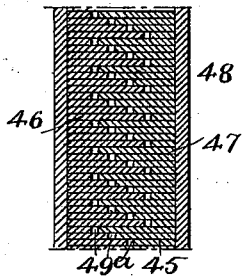
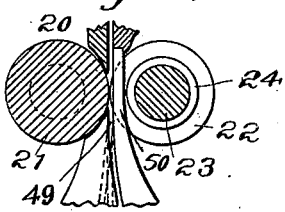
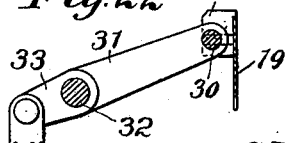
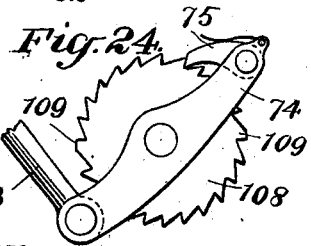
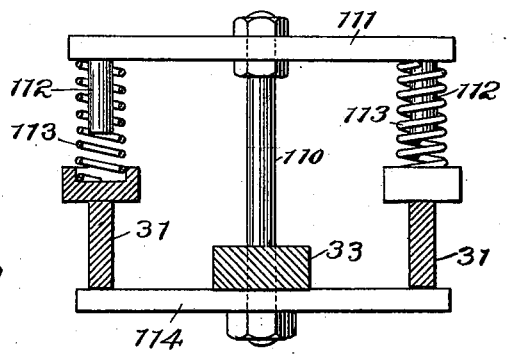
WITNESSES: INVENTOR No. 656,014. Patented Aug. 14, 1900.
J. A. E. CRISWELL.
MACHINE FOR MAKING MATCHES.
(Application filed June 1, 1900.)
(No Model.) 7 Sheets—Sheet 7.
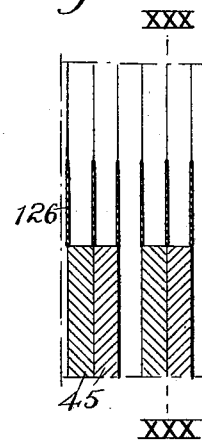
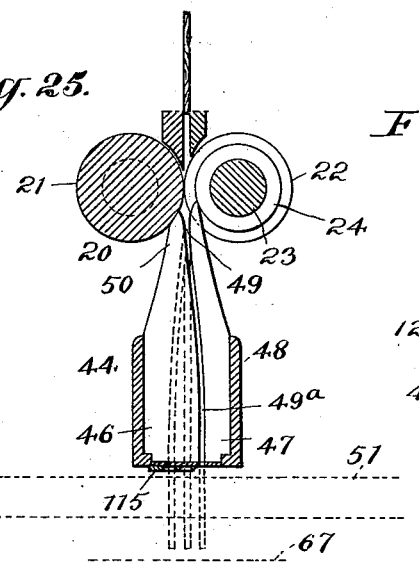
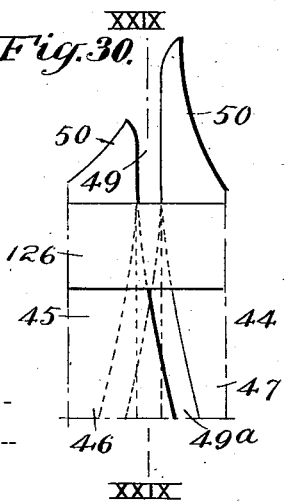
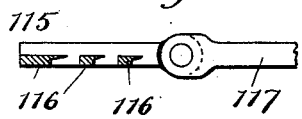
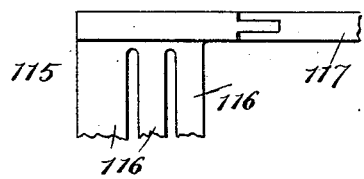
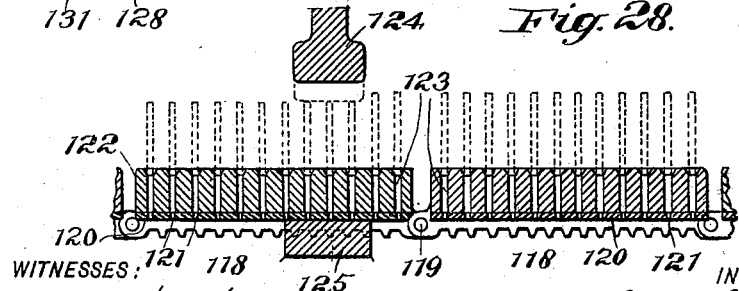
WITNESSES: William Faster, A. W. Stanly
INVENTOR: J. A. E. Criswell

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 656,014, dated August 14, 1900.

Application filed June 1, 1900. Serial No. 18,695. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, but more particularly to machines such as disclosed in my applications filed November 16, 1899, Serial No. 737,186, Serial No. 13,657, filed April 20, 1900, and other applications in which the splints are cut from veneer.
The primary object of the invention is to provide simple and efficient means by which splints may be cut from veneer and as they are cut will be separated and then discharged into a holding device or carrier in such a manner that the splints will be under positive control from the time they are cut until they are held for completing the matches.

Another object of the invention is to provide simple and efficient means which receives the splints immediately they are cut and simultaneously separates them into a series of more than two independent rows spaced apart and in position to be held by the carrier.
A further object is to provide a simple and efficient holding device or carrier for the splints.

The invention will be hereinafter more particularly described with reference to the accompanying drawings, which form a part of this specification, and then pointed out in the claims at the end of the description.

Figure 2:
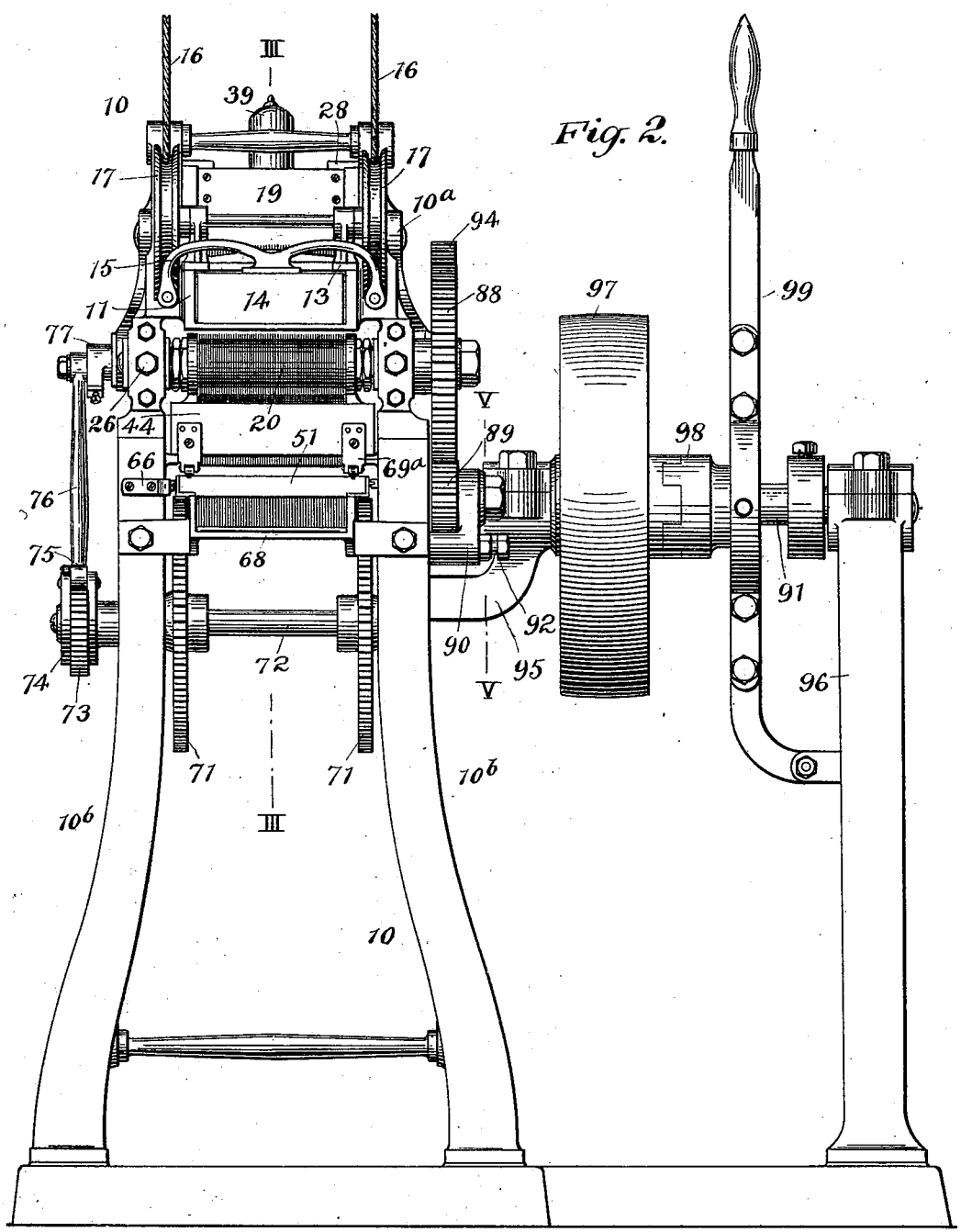
Figure 3:
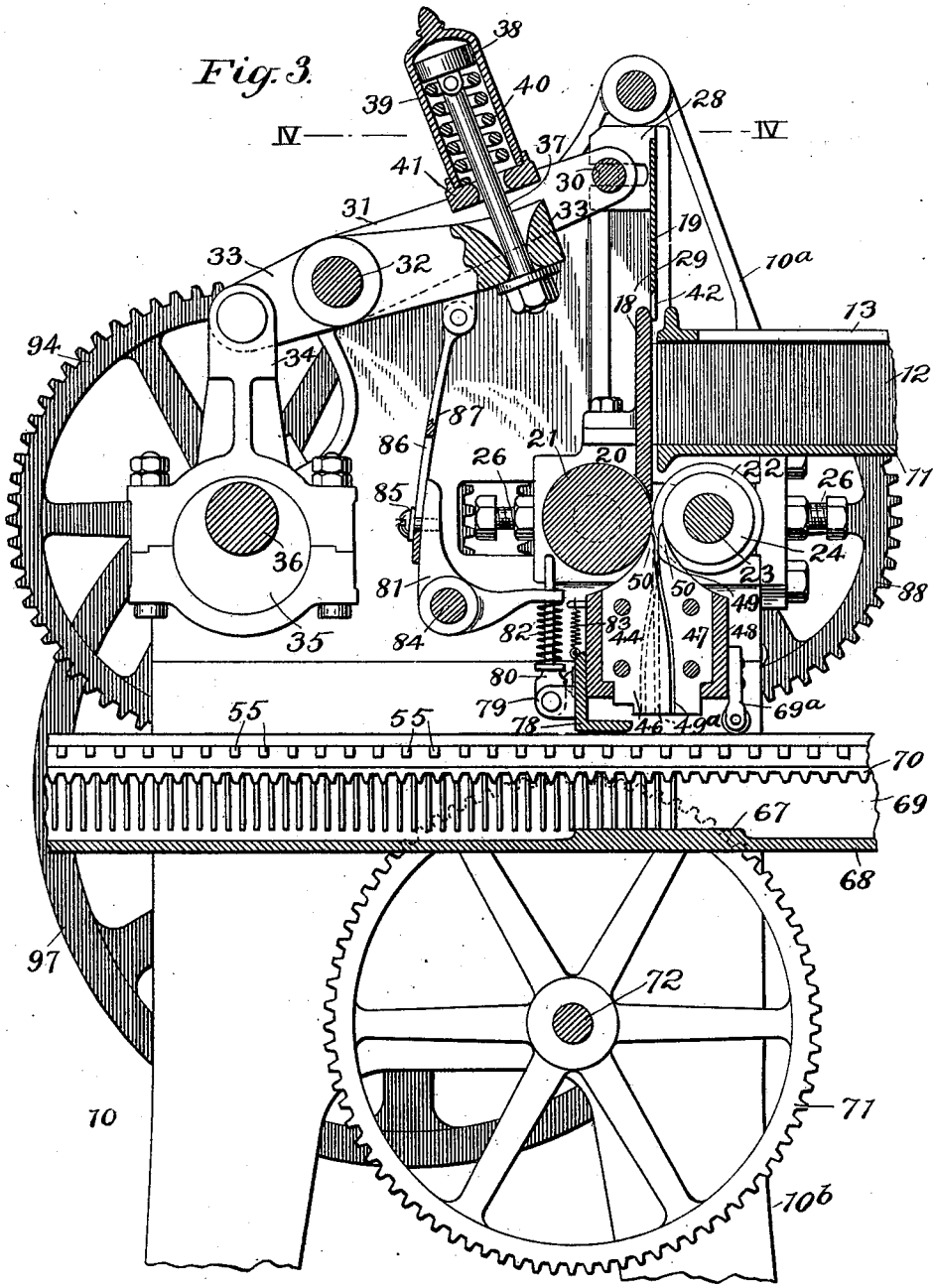

In the drawings, wherein similar figures of reference designate similar parts, Figure 1 is a general perspective view of one form of machine embodying my invention. Fig. 2 is a front elevation. Fig. 3 is a vertical section, partly in elevation and on an enlarged scale, taken on the line III III of Fig. 2.
Fig. 4 is a fragmentary sectional plan, partly in elevation, taken on the line IV IV of Fig. 3, showing the plunger-operating mechanism. Fig. 5 is a fragmentary vertical section taken on the line V V of Fig. 2, showing the means for driving the cutter and the eccentric shafts. Fig. 6 is a fragmentary elevation of the plunger. Fig. 7 is a fragmentary plan of one form of cutting device. Fig. 8 is a fragmentary sectional plan through the separator. Fig. 9 is a detail view, on an enlarged scale, showing how the material is cut into splints. Fig. 10 is a vertical transverse section, on an enlarged scale, of one form of carrier or holding device, taken on the line X X of Fig. 11. Fig. 11 is a fragmentary plan view, partly in section, of the carrier. Fig. 12 is a fragmentary perspective view of one of the devices for holding the splints in the carrier. Fig. 13 is another form of the device shown in Fig. 12. Fig. 14 is a vertical section through a cutting device and a separator similar to that shown in the other views, except that the separator divides the splints into four independent rows. Fig. 15 is a vertical section through the cutting device, the center of the roll being above the center of the cutting-roll to take the thrust more direct while cutting the splints. Fig. 16 is a detail vertical section of another form of cutting device in which there are two sets of overlapping knives. Fig. 17 is a vertical section taken on the line XVII XVII of Fig. 18, showing how the cutting device and the separator may be arranged in a box which is removably held to the frame. Fig. 18 is a fragmentary front elevation of the form shown in Fig. 17. Fig. 19 is a sectional plan through the separator, taken on the line XIX XIX of Fig. 17, showing how either or both sections of the separator may be removed. Fig. 20 is a sectional plan through a separator in which the splints are divided into four independent rows. Fig. 21 shows how the fingers of one section of the separator may be carried above and between the knives or cutters. Fig. 22 is a vertical section showing the plunger connected positively to the rock-shaft. Fig. 23 is a modified form of device for yieldingly connecting the plunger to the rock-shaft. Fig. 24 is a detail view of another form of ratchet mechanism for operating the carrier. Fig. 25 is a fragmentary vertical section of a machine in which the material is first cut into long splints and then by a second cutting device cut into smaller or complete splints. Fig. 26 is a fragmentary section of the second cutting device. Fig. 27 is a plan view of the cutting device shown in Fig. 26. Fig. 28 is a vertical section of another form of carrier in which the sections are linked together. Fig. 29 is a vertical transverse section of the separator, on an enlarged scale, taken on the line XXIX XXIX of Fig. 30, showing how small thin strips of metal might be placed between the plates of the separator at the point where the channels intersect to assist in preventing the splints from passing into the wrong channels. Fig. 30 is a vertical section taken on the line XXX XXX of Fig. 29. Fig. 31 is a fragmentary section of another form of carrier, and Fig. 32 is a detail view of one of the splint-holding devices of the carrier shown in Fig. 31 before being applied.

The frame 10 may be variously constructed and may comprise the sections or frame proper, 10$^a$, and the legs 10$^b$. On the sections 10$^a$ and secured thereto is an open-ended box 11, in which are placed the veneer blanks or cards 12, and over the veneer blanks are the ledges 13, forming a part of the box and adapted to prevent upward movement of the blanks. In the box 11 is a follower 14, on the top of which is secured a yoke 15, which has its outer ends extending downward on the outside of the box 11 in a plane at or about the longitudinal center thereof. The ends of the yoke 15 have the ropes 16 or other flexible means connected thereto, which pass over the sheaves 17 and then over pulleys, (not shown,) and on the ends of the ropes may be weights which force the follower forward, so as to carry the inner card or blank against the plate or abutment 18, though other means than that described may be employed for feeding the blanks. This plate 18 is secured to lugs on the frame and is separated from the open end of the box 11 by a space somewhat greater than the thickness of the blanks 12 to permit the latter to pass out of the box one at a time, the blanks 12 being of just the thickness and length of the splints and of a width which will permit a number of splints to be cut therefrom. Over the box 11 and adapted to work between the inner open end of the box 11 and the abutment 18 is a reciprocatory plunger 19, which at each downward movement forces a card 12 to the cutting device 20.

While I have shown a particular form of cutting device, it will be understood that the means for cutting the splints may be varied as desired. As shown, the cutting device 20 comprises a preferably smooth and hardened metal roll 21 and a series of cutters or knives 22. These cutters are circular, Figs. 3 and 7, and are spaced apart on the shaft or spindle 23 the width of the splints by the washers 24. The cutters are beveled from both sides and in operation cut the splints in a close row immediately adjacent to each other. The cutters are rigidly held on the shaft or spindle 23 by the nuts 25, and the bearings of both cutter-spindle 23 and the roll 21 are adjustable by the bolts 26. The spindle 23 is parallel with the roll, and on each side of the series of cutters are collars 27, which are preferably hardened. These collars permit the knives or cutters to be adjusted close to the rolls without liability of injury to the cutters, and the collars may be adjusted hard against the roll 21, so that both roll and cutters will rotate in unison, the roll being idle, though, if desired, it may be geared to the cutter-spindle. The cutters in this case are held so close to the roll that a practical separation of the veneer takes place and at most only the slightest kind of a film unites the splints, as shown in Fig. 9. When two spindles are used with overlapping knives, very nice adjustment is required in spacing the knives, and, furthermore, the care of two spindles of knives or cutters is greater and the friction greater than in the cutting device described by reason of the splints forcing the opposed surfaces of the cutters of both spindles hard against each other.

The plunger 19 is carried by the slides 28, which move vertically in the guides 29 on the frame, and in the slides 28 are grooves in which the ends of the rod 30 move. The rod 30 passes through the inner ends of the arms or levers 31, which latter are secured at their other ends to a rock-shaft 32. On the shaft 32 is an arm 33, which has one end connected to the straps 34 of the eccentric 35, the latter being secured to the rotary shaft 36. The arm 33 is loose on the rock-shaft 32 and has its forward or inner end provided with an opening through which passes a bolt 37. This bolt has its upper end pivoted to a piston or follower 38, which is movable in a drum or casing 39, Fig. 3, and beneath the piston is a spring 40, that rests upon a cross-bar 41. The cross-bar 41 is secured to the arms or levers 31, and through the spring 40, bolt 37, and connections the arm 33 and levers 31 are yieldingly held together. The spring 39 is of such strength that it will not yield under ordinary pressure or that required to force the blanks or cards 12 to the cutting device 20, though more than one spring or any other means may be used for providing a yielding connection between the plunger 19 and its operating mechanism. The lower end of the plunger is slotted, as at 42, Figs. 3 and 4, to permit the said plunger to follow the card until the cutters are through cutting the splints. It will be seen that as the shaft 36 and eccentric are operated the arm 33 and levers 31 will move in unison and will cause the plunger 19 to force one of the cards 12 through the space between the box 11 and the abutment 18 to the cutting device. As soon as the cutters begin cutting the splints, and particularly if the plunger moves through a given distance faster than the cutters, the spring 40 will yield and will permit the arm 33 to be operated independently of the levers 31. The plunger will continue to move downward, exerting pressure on the card until cut, and as the arm 33 is moved in the opposite direction the projecting portions 43, Fig. 4, will engage the under surface of the levers 31 and will raise the plunger to the position to force the next card to the cutting device. By having the plunger follow the card or blanks until cut the latter are less likely to split by reason of defects or for other causes, and the yielding variable speed of the plunger does not require the nice adjustment of speed or stroke that would be necessary if the plunger were positively driven by an eccentric or otherwise, as it is necessary for practical purposes to allow for the cutters being sharpened. Furthermore, while the cutters are acting on the veneer its downward movement is entirely under the control of the cutters and cannot be forced past them without crushing the wood, and the plunger following the card, as it does until cut, assists the cutting device and finally assists in alining the splints.

To separate the splints in proper position to be discharged and held by the holding means or devices, a separator, as at 44, is provided. This separator may be variously constructed and may be of any desired length. As shown, a number of plates 45, comprising opposed members 46 and 47, are secured in a box 48, which is bolted to the frame directly beneath the cutting device 20. The members 46 and 47 of the plates form between them a series of independent parallel rows of channels, openings, or ways 49$^a$, Figs. 3 and 8, for the splints, which in this case are three rows. Each channel forms a continuation of a single way, pass, or opening 49, into which latter the splints pass in a common plane. The upper ends of the plates are provided with fingers or extensions 50, one set of which project upward between the cutters 22. Each finger of one side of the separator is cut away a portion of its length to permit the knives or cutters to work between them to sever the splints, the cutters during their downward rotary movement carrying the veneer card with them and forcing the splints as they are cut into the channels 49$^a$. The channels, if short, may be slightly curved, and in this case the lower portions of said channels are straight, so as to be sure that the splints, if any are bent, will be straightened again in passing therethrough, or the channels may be of such length that the splints will have a straight and direct course. The splints as they are cut are forced by those following through the channels 49$^a$ and are discharged into a suitable carrier or holding device. By this means the splints are under positive control at all times, and the splints properly spaced are given a substantially-direct course through the channels.

The holding device or carrier may be of any suitable form or construction. In the form shown in Figs. 1 to 12, inclusive, the carrier 51 has the end pieces 52, between which are the transverse bars 53. These pieces may be made of wood or other material, and between the bars 53 are formed openings 54, into which the splints pass endwise from the separator. Some of the bars 53 may be made in two pieces, and between the two opposed pieces of the bars are slides or splint-engaging devices 55. Each slide is arranged to hold the splints of two rows; but a slide might be provided for each row of splints. The slides are frictionally held in the carrier by springs 56 or otherwise and have metallic strips 57 and 58 on the carrier to provide a bearing-surface when the carrier is made of wood or like material. On opposite sides of each slide are projecting portions 59, one for each splint, which have the horizontally-disposed teeth 60, on which is a single penetrating point. The teeth, as well as the manner of carrying and causing the teeth to engage the splints, may be varied as desired, and said slides may have the vertically-disposed teeth 61, on which are the two points 62, as in Fig. 13. The slides are normally in the position shown in Fig. 10, and as the carrier travels forward one end will engage the inclined surface 65, also on the frame, thus giving a push-and-pull action to cause the points on the teeth to penetrate the surface of the splints, as shown in Fig. 11. As the carrier enters the machine a bracket 66, Figs. 1 and 2, on the front of the frame forces the holding devices transversely of the carrier, to be sure that the splints will not strike the teeth when passing into the openings of the carrier, and a similar device may be employed for releasing the splints after they have been treated to complete the matches. The splints as they are discharged from the separator into the openings of the carrier will rest upon the surface 67 of the table 68. This table is secured to the frame and has the vertical rails 69, along and upon which the carrier travels, the carrier being held from upward vertical movement by the rolls 69$^a$, which are carried by the separator-box 48.

The driving mechanism for the carrier may be variously constructed. The carrier has the racks 70, which are in mesh with the gears 71. These gears are secured to the transverse shaft 72, and on the outer end of said shaft is a ratchet-wheel 73, on each side of which is an arm 74. The arms carry at one end a spring-pressed pawl 75, and their other ends are connected to a rod 76. This rod is connected at its other end to a crank 77 on the outer end of the shaft 38, so that as the latter shaft rotates the gears 71 will be given a step-by-step movement which will move the carrier each time a distance sufficient to remove the rows of splints discharged from the separator and place a series of rows of empty openings in position to receive the next series or sets of splints. The gears 71 are preferably so proportioned that the racks may engage any tooth and still have the openings in the carrier in proper alinement with the channels of the separator, so that the separate holding devices may be readily passed through the machine to be filled with splints.

In some instances some of the splints do not rest upon the surface 67 of the table, and consequently are not alined properly for heading. To accomplish this, a plate 78 is held to the rear of the box 48, so as to move vertically thereon. The plate 78 is provided with a lug 79, to which is pivoted a rod 80. This rod has its upper end slidingly held in one end of a rocking arm 81, and beneath said end and around the rod 80 is a spring 82, by which the plate 78 is forced downward with a yielding pressure, the plate being returned to its normal position or upward by a spring or springs 83. The arm 81 is carried by a shaft 84, and said arm has one end provided with a bolt 85, which works in a slot 86 in a lever 87. This lever is pivoted to the arm 33, and on its downward movement does not operate the arm 81 and the plate 78, but on its extreme upward movement will rock the arm 81 and will force the plate 78 downward to force any splint that might project upward down upon the plate 67 while the carrier is stationary.

Any suitable mechanism may be employed for operating the cutting device and the eccentric-shaft 36. On one end of the cutter-spindle 23 is a gear 88, that meshes with a pinion 89. This smaller gear or pinion is carried by an arm 90, Figs. 2 and 5, which is loosely mounted on the main driving-shaft 91 at one end and has its other end adjustably secured to the frame by a bolt 92. The drive-shaft 91 has a small gear or pinion 93 at one end, which meshes with the pinion 89, and a gear 94 on the eccentric-shaft 36 and by which the cutter and the eccentric-shafts are rotated. The drive-shaft 91 is journaled at one end in a bracket 95 and its other end in a bearing 96, secured to the base-plate. At 97 are a belt and fly-wheel loosely held on the shaft 91 and to which one member of a clutch 98 is fixed, while the other member is slidingly held on the drive-shaft and is thrown in or out of connection with the fly-wheel member by a lever 99. Ordinarily, however, it is desirable to provide a friction-clutch which is operated by a pedal instead of a hand-lever.

The invention will be readily understood from the foregoing description when taken in connection with the accompanying drawings.

The parts being in the position shown and the main driving-shaft started it will be seen that the plunger 19 will at each reciprocation force or drive one of the cards 12 out of the box 11 to the cutting device 20. The cutting device will cut the card or blank into splints and will force them into the single pass 49 and the channels 49ª, advancing those already in the channels the length of the splints. The splints, if at all bent in passing through the channels, will be again straightened while passing through the straight lower portions of the channels 49ª, and as they pass out of the channels they enter the openings 54 in the carrier 51 and will rest upon the surface 67 of the table 68. The plunger 19 will follow each card until it is cut into splints and will assist in alining them after being cut. The stroke of the plunger is sufficient to reach about the center of the cutting device, and as the cutting device is cutting the splints the plunger will yield, if necessary, owing to the spring connection between the levers 31 and the arm 33. As the carrier is moved forward by the mechanism previously described any splints that are not properly alined will be forced down upon the surface 67 through the device 78 and its operating mechanism. This device is forced downward during the upward stroke of the plunger and while the carrier is stationary. This operation is repeated until the carrier is filled with splints, when another may take its place and the one filled taken and the splints treated to complete the notches in the usual or in any preferred manner. If the splint material is not dry, the splints are first dried before being dipped, as is usual, and this step, as well as the completion of the matches, may be continuous, as in some of the systems now used, by linking a series of the holding devices together. It will thus be seen that simple and efficient means are provided by which a large number of splints may be simultaneously cut and the cut splints separated into independent rows in position for completing the matches, the splints being at all times under complete control.

The relative position of the separator with respect to the cutting means and the number of rows into which the splints are divided may be changed.

In Fig. 14 the splints are divided into four rows and otherwise the structure is substantially identical with that already described.

In Fig. 15 the construction is the same as in the other views, except that the center of the roll is somewhat higher than the center of the cutter-spindle in order to take the thrust more direct and as soon as the cutters act upon the material.

Fig. 16 shows a cutting device in which there are two spindles 100, each provided with knives or cutters 101, spaced apart, the knives of one spindle overlapping those of the other.

The cutting device and separator shown in Figs. 17 to 19, inclusive, have the cutting device and the separator removably held in a box 102, which in turn is removable from the frame. The cutting device is the same as hereinbefore described, but the separator differs somewhat in the method of fastening. In the form shown the members 46 of the plates 45 are each provided with a dovetailed portion 103, which fits into a similarly-formed groove in a plate 104, and the members 47 are likewise held in a plate 105. These two plates form a box or casing 106, and are removably held to bosses on the box 102 by screws or bolts 107. It will thus be seen that all the parts carried by the box may be removed from the frame, and either or both sets of members forming the plates 45 may be quickly and independently removed if for any reason it becomes necessary to do so.

Fig. 20 is a sectional plan of the separator shown in Fig. 14, and is the same as shown in Fig. 8, except that like Fig. 14 it provides for separating the splints into four independent rows.

In Fig. 21 the fingers 50 of one set of members of the separator are extended above the center of the cutters.

Fig. 22 shows how the plunger might be driven positively either by an eccentric or by a cam, in which latter case the plunger is given a variable speed, so as to not exert too great a pressure on the wood while engaged by the cutters, and finally to assist in alining the splints. In this case the levers 31 and arm 33 are rigidly secured to the rock shaft 32.

The ratchet-and-pawl mechanism shown in Fig. 24 may be used when the separate holding devices are made to follow immediately after each other or the devices are linked together to provide for the continuous process. The ratchet-wheel 108 is provided at fixed intervals with teeth 109, which are larger than the other teeth. This will give a longer throw to the ratchet-wheel, and so compensate for the space required between two adjacent sections.

In Fig. 23 a slightly-different form of yielding plunger connection is shown. The arm 33 is provided with a bolt 110, upon the upper end of which is a cross-bar 111. The cross-bar carries lugs or bolts 112, around which are springs 113, which are held between the levers 31 and said cross-bars. Secured to the under side of the arm 33 is a second cross-bar 114 by which the levers 31 are positively raised on the upward movement of the arm 33.

The cutting device and the separator shown in Fig. 25 may be substantially the same as already described. Here longer blanks or strips of veneer are used, and the blanks are cut into long splints or splint-strips, which are separated as already described. The splints pass into the holding device or carrier, as shown in dotted lines, and beneath the separator and movable across its lower face is a second cutting device 115. This second cutting device has the knives 116, one for each row of splints, and may be reciprocated by a rod 117 or in any other suitable manner. The cutting device 20 and the second cutting device 115 are so timed that the long strips are cut into complete splints of the proper length.

The carrier shown in Fig. 28 comprises sections 118, linked together at 119, so as to form a continuous endless belt or carrier. Each section has a plate 120, provided with holes 121, which are smaller than the cross-section of the splints. Over the plates 120 are thicker plates of wood or other material 122, in which are openings 123 slightly larger than the cross-section of the splints and which register with the smaller holes 121. The splints fit loosely in the openings 121, so as to be supported in a vertical plane, and as the carrier moves forward they pass under a reciprocating plunger 124. This plunger forces the splints into the openings 121 of the plate 120 and are rigidly held for treating the splints to complete the matches, the bar 125 taking the downward thrust of said plunger. When the continuous process is used, plungers or other devices may be employed for ejecting the matches from the carrier, and the form of carrier shown may be used as an endless belt or as separate and independent sections.

The separator shown in Figs. 29 and 30 is similar to that already described, and between the plates 45 across the members 46 and 47 and at a point where the channels 49$^a$ intersect after diverging from the single pass or opening 49 is a preferably-thin strip of sheet metal 126. These strips form a side partition or wall for the channels 49$^a$ and prevent all liability of the splints passing into the wrong channels, though it will be understood that the means for forming a side wall or partition for the channels 49$^a$ may vary as desired.

In Figs. 31 and 32 is shown a carrier in which the plates or sections 127 are provided with a series of rows of apertures corresponding to the rows into which the splints are separated. The holes in the carrier are countersunk on its upper surface, and in the holes are secured bushings 128, forming holding devices for the splints. These holding devices have a shoulder 129, and its end is flared to correspond to the countersunk portion of the carrier-holes, by which and the shoulder 129 said devices are rigidly held in the carrier. The holding devices have flared lower ends 131, and between said ends and the shoulders 129 they are cut and pressed inward to form gripping and spring fingers 132, by which the splints are rigidly held when forced into engagement therewith.

It will be understood that a blower or exhausting means may be employed to remove any waste or dust that might occur in cutting the splints and that suitable locking and alining means might be employed to positively hold the carrier while receiving the splints from the separator. It will be further understood that where the channels are long and free suitable means might be employed to support the splints in the channels and prevent the liability of any of them dropping out until they are forced out by those entering the channels.

Having thus described my invention, what I claim as new, and desire to secure by Letters Patent, is—

1. A match-making machine, comprising splint-cutting means, a separator provided with a single way, pass or opening in the plane of the material and diverging into independent rows of independent channels having fixed or stationary walls, each channel forming a continuation of said single way or pass, and holding means for the splints.

2. In a match-making machine, the combination with splint-cutting means, of a separator provided with a single way, pass or opening in the plane of the card and diverging into independent rows of independent channels having fixed or stationary walls, each channel forming a continuation of said single way or pass and the plane of its divergence being at right angles to the plane of the single way or pass, and holding means for the splints.

3. In a match-making machine, the combination with a splint-cutting device provided with a series of knives or cutters spaced apart, of a separator provided with fingers entering between the knives and forming a single way or pass in the plane of the material and diverging independent rows of channels having fixed or stationary walls, each channel forming a continuation of said single way or pass, and holding means for the splints.

4. In a match-making machine, the combination with a splint-cutting device provided with a series of knives or cutters spaced apart, of a separator provided with fingers entering between the knives and forming a single way or pass in the plane of the card and diverging independent rows of independent channels having fixed or stationary walls, each channel forming a continuation of said single way or pass and the plane of its divergence being at right angles to the plane of the single way or pass, and holding means for the splints.

5. A match-making machine, comprising splint-cutting means having knives or cutters spaced apart equal to the width of the splints and cutting the latter, in a close row, a separator receiving the splints endwise and separating them into a series of more than two independent rows, and holding means for the splints.

6. In a match-making machine, the combination with a splint-cutting device having a series of knives spaced apart and cutting the splints in a close row, of a stationary separator having a series of more than two independent rows of independent channels receiving the splints endwise direct from the cutting device, and holding means for the splints.

7. A match-making machine, comprising splint-cutting means, a separator having a single way, pass or opening in the plane of the material and diverging into more than two independent rows of independent channels, each channel forming a continuation of said single way or pass, and holding means for the splints.

8. In a match-making machine, the combination with splint-cutting means of a separator having a single way, pass or opening in the plane of the card and diverging into more than two independent rows of independent channels, each channel forming a continuation of said single way or pass and the plane of its divergence being at right angles to the plane of the single way or pass, and holding means for the splints.

9. In a match-making machine, the combination with a splint-cutting device provided with a series of knives or cutters spaced apart and cutting the splints in a close row, of a separator having fingers entering between the knives and forming a single way, opening or pass in the plane of the material and more than two independent rows of diverging channels, each channel forming a continuation of said single way or pass, and holding means for the splints.

10. In a match-making machine, the combination with a splint-cutting device provided with a series of knives or cutters spaced apart equal to the width of the splints, of a separator having fingers entering between the knives and forming a single way, pass or opening in the plane of the card and more than two independent rows of independent diverging channels, each channel forming a continuation of said single way or pass and the plane of its divergence being at right angles to the plane of the single pass, and holding means for the splints.

11. In a match-making machine, the combination with a cutting device and means for feeding veneer cards endwise to the cutting device, of a separator located adjacent to and receiving complete splints in a common plane, direct from the cutting device and provided with independent rows of diverging channels having fixed or stationary walls separating the splints into parallel rows, and holding means for the splints.

12. In a match-making machine, the combination with a cutting device and means for feeding the material endwise to the cutting device, of a separator located adjacent to and receiving complete splints in a common plane direct from the cutting device and having more than two independent rows of diverging channels separating the splints into parallel rows, and holding means for the splints.

13. In a match-making machine, the combination with a cutting device having knives or cutters spaced apart, of a separator located beneath and immediately adjacent to and receiving complete splints in a common plane direct from the cutting device and provided with independent rows of diverging channels having fixed or stationary walls separating the splints into parallel rows, each channel forming a continuation of one of the spaces between the cutters, and holding means for the splints.

14. In a match-making machine, the combination with a cutting device having knives or cutters spaced apart equal to the width of the splints and cutting the latter in a close row and means for feeding veneer cards to the cutting device, of a separator located beneath and immediately adjacent to and receiving complete splints in a common plane direct from the cutting device and provided with independent rows of diverging channels having fixed or stationary walls separating the splints into parallel rows, each channel forming a continuation of one of the spaces between the cutters, and holding means for the splints.

15. In a match-making machine, the combination with a cutting device having knives spaced apart, of a stationary separator located immediately adjacent to the cutting device and having a series of more than two independent rows of diverging channels, each channel forming a continuation of one of the spaces between the knives or cutters and receiving complete splints endwise from said cutters, and holding means for the splints.

16. In a machine for making matches, the combination with a cutting device having a series of cutters or knives spaced apart and cutting the splints in a close row, and means for feeding veneer cards endwise to said cutting device, of a separator located immediately adjacent to the cutting device and having a series of more than two independent rows of independent channels, each channel forming a continuation of one of the spaces between the knives and receiving complete splints endwise from the cutters, and holding means for the splints.

17. In a match-making machine, the combination with means for supplying splints, of a separator provided with independent rows of independent channels having fixed or stationary walls receiving the splints in a close row and in a common plane and separating them into independent parallel rows, and holding means for the splints.

18. In a match-making machine, the combination with means for supplying splints, of a separator receiving the splints in a common plane and separating them into a series of more than two independent parallel rows, and holding means for the splints.

19. In a match-making machine, the combination with splint-cutting means cutting the material in a substantially-close row, of a separator receiving the splints endwise in a common plane and separating them into a series of more than two independent parallel rows, and holding means for the splints.

20. In a match-making machine, a separator provided with a single way, pass or opening in the plane of the material and diverging into independent rows of channels having fixed or stationary walls, each channel forming a continuation of said single way or pass.

21. In a match-making machine, a separator having a single way, pass or opening in the plane of the material and diverging into more than two independent rows of independent channels, each channel forming a continuation of said single way or pass.

22. In a match-making machine, a separator provided with a single way, pass or opening in the plane of the card, and diverging into independent rows of independent channels having fixed or stationary walls, each channel forming a continuation of said single way or pass, and the plane of its divergence being at right angles to the plane of the single way or pass.

23. A match-making machine, comprising splint-cutting means, a cutting device having knives or cutters spaced apart, a separator provided with fingers entering between and extending to the opposite sides of the cutters so as to form a single way, pass or opening in the plane of the material, and diverging independent rows of channels having fixed or stationary walls, each channel forming a continuation of said single way or pass, and holding means for the splints.

24. In a match-making machine, the combination with a cutting device having knives spaced apart, of a stationary separator located immediately adjacent to the cutting device and having fingers entering between and extending to the opposite side of the cutters and forming a single way, pass or opening in the plane of the card, and diverging independent rows of channels, each channel forming a continuation of said single way or pass and the plane of its divergence being at right angles to the plane of the single way or pass, and holding means for the splints.

25. In a match-making machine, the combination with a splint-cutting device having a series of cutters or knives spaced apart, of a stationary separator located immediately adjacent to the cutting device and comprising a series of plates having fingers entering between the knives and independent rows of diverging channels, each channel forming a continuation of one of the spaces between the knives and into which the splints are guided endwise from the cutting device, and holding means for the splints.

26. In a match-making machine, the combination with splint-cutting means, of a stationary separator comprising a series of plates forming a single way, pass or opening in the plane of the material and independent rows of independent channels, each channel forming a continuation of said single way or pass, and the plane of its divergence being at right angles to the plane of the single way or pass, and holding means for the splints.

27. In a match-making machine, the combination with a cutting device having knives or cutters spaced apart, of a stationary separator located immediately adjacent to the cutting device, and having a series of short independent rows of independent diverging channels, each channel forming a continuation of one of the spaces between the cutters, and holding means for the splints.

28. In a match-making machine, the combination with a cutting device having knives or cutters spaced apart and cutting the splints in a close row, of a stationary separator located immediately adjacent to the cutting device and having more than two independent rows of short diverging channels, each channel forming a continuation of one of the spaces between the cutters, and holding means for the splints.

29. In a match-making machine, the combination with splint-cutting means, of a separator having a single way, pass or opening in the plane of the material and diverging into independent rows of independent short channels through which splints are forced, each channel having fixed or stationary walls forming a continuation of the single way or pass, and the plane of its divergence being at right angles to the plane of the pass or way, and holding means for the splints.

30. In a machine for making matches, the combination with a splint-cutting device having knives spaced apart and cutting the splints in a close row, of a stationary separator located beneath and immediately adjacent to the cutting device and comprising a series of plates forming between them a single pass, way or opening in the plane of the card and more than two independent rows of independent short diverging channels through which complete splints are forced by those following, each channel forming a continuation of the single way or pass, and the plane of its divergence being at right angles to the single way or pass, and holding means for the splints.

31. In a match-making machine, the combination with a splint-cutting device, of a separator dividing the splints into a series of more than two independent rows, and holding means for the splints.

32. In a match-making machine, the combination with splint-cutting means, of a separator receiving the splints endwise direct from the cutting means and dividing them into a series of more than two independent rows, and holding means for the splints.

33. A match-making machine, comprising splint-cutting means, a separator provided with a single way, pass or opening in the plane of the material and diverging into four independent rows of independent channels having fixed or stationary walls, each channel forming a continuation of said single way or pass, and holding means for the splints, substantially as and for the purpose set forth.

34. In a match-making machine, the combination with a splint-cutting device having a series of knives spaced apart, of a stationary separator provided with a series of four independent rows of independent channels having fixed or stationary walls and receiving the splints endwise from the cutting device, and holding means for the splints, substantially as and for the purpose set forth.

35. In a match-making machine, the combination with a splint-cutting device, of a separator dividing the splints into a series of more than two independent rows, holding means for the splints, and means located in the path of movement of the splints and adapted to engage their ends for driving them into the carrier and alining the same.

36. In a match-making machine, the combination with splint-cutting means, of a separator dividing the splints into a series of independent rows, a carrier for the splints, means for holding cards or blanks on one side of the cutting means, together with a plunger and yielding connections therefor for forcing the cards to the cutting means and to assist in alining the splints.

37. In a match-making machine, the combination with splint-cutting means, of a separator dividing the splints into a series of more than two independent rows, a carrier for the splints, means for holding cards or blanks on one side of the cutting means, together with a plunger and yielding connections therefor for forcing the cards to the cutting means and to assist in alining the splints.

38. In a match-making machine, the combination with splint-cutting means, of a separator dividing the splints into a series of independent rows, a carrier for the splints, means for holding cards or blanks on one side of the cutting means, together with a plunger which changes the speed while the cards are being cut into splints and which assists in finally alining the splints, substantially as and for the purpose described.

39. In a match-making machine, the combination with splint-cutting means, of a separator dividing the splints into a series of more than two independent rows, a carrier for the splints, means for holding cards or blanks on one side of the cutting means, together with a plunger having a variable speed during the stroke that forces the cards to the cutting means, substantially as and for the purpose described.

40. In a match-making machine, the combination with a splint-cutting device having knives spaced apart, means for holding cards or blanks on one side of the cutting means, a separator for the splints, a carrier, and a plunger device having its end cut or slotted to pass some distance by the knives, substantially as and for the purpose described.

41. In a machine for making matches, the combination with means for supplying splints, of a separator having more than two independent rows of channels and comprising two separable sections permitting ready access to said channels, and holding means for the splints.

42. In a machine for making matches, the combination with means for supplying splints, of a separator having a single way or pass and independent rows of channels forming a continuation of the single way or pass, thin strips of metal forming a side partition or wall for the channels at the point where they join the single pass, and holding means for the splints.

43. The combination with means for supplying splints, of a holding device or carrier having independent rows of openings receiving the splints endwise and spaced apart, and devices movable in the carrier and having teeth which penetrate the surface of the splints and hold them against the walls of the openings of the carrier.

44. The combination with splint-cutting means, of a carrier or holding device having a series of independent rows of openings receiving the splints endwise, and slides movable transversely of the splints and provided with teeth which penetrate the surface of the splints.

45. The combination with a splint-cutting device, of a carrier or holding device having a series of independent rows of openings receiving the splints endwise, and a slide for each two rows of splints, said slide having outwardly-projecting portions on opposite sides thereof having teeth which engage each splint to hold it in the carrier.

46. A carrier or holding device for match-splints, having a series of rows of openings therein adapted to receive splints endwise, and devices having teeth to penetrate the surface of the splints to hold them in the carrier.

47. In a match-making machine, a carrier or holding device having a series of rows of openings therein adapted to receive splints endwise, and slides movable transversely of the splints and provided with teeth which penetrate the surface of the splints.

48. A carrier or holding device for match-splints having a series of rows of openings therein adapted to receive splints endwise, and a slide for each two rows of openings having outwardly-projecting teeth on opposite sides thereof which engage each splint to hold it in the carrier.

49. A carrier or holding device for match-splints having a series of rows of openings therein adapted to receive splints endwise, and a slide for every two rows of openings having a series of outwardly-projecting portions on opposite sides thereof, said portions being each provided with a tooth having two points which penetrate the surface of each splint to hold it in the carrier.

Signed at New York, in the county of New York and State of New York, this 31st day of May, A. D. 1900.

JAMES A. EKIN CRISWELL.

Witnesses:
WILLIAM FOSTER,
A. W. STANLEY.